United States Patent [19]
Senna et al.

[11] Patent Number: 5,795,537
[45] Date of Patent: Aug. 18, 1998

[54] METHOD OF PRODUCING COMPOSITE OXIDE CERAMICS

[75] Inventors: Mamoru Senna, Chofu; Sang-Hee Cho, Taegu; Kenji Hamada, Tokyo, all of Japan

[73] Assignee: Nara Machinery Co., Ltd., Tokyo, Japan

[21] Appl. No.: 693,608

[22] Filed: Aug. 7, 1996

[30] Foreign Application Priority Data

Aug. 9, 1995 [JP] Japan ................... 7-203322

[51] Int. Cl.$^6$ ................... C04B 35/622
[52] U.S. Cl. ........... 264/621; 264/642; 264/655; 264/658; 264/661; 264/678
[58] Field of Search ............... 264/60, 61, 67, 264/621, 642, 655, 658, 661, 678

[56] References Cited

U.S. PATENT DOCUMENTS

| | | |
|---|---|---|
| 4,946,810 | 8/1990 | Heistand ................... 264/63 |
| 5,096,642 | 3/1992 | Shirasaki ................... 501/126 |

FOREIGN PATENT DOCUMENTS 60-225051  11/1985  Japan.

OTHER PUBLICATIONS

Chemical Engineer's Handbook, Robert H. Perry, McGraw-Hill Book Co., New York, 1973, pp. 8–43, 44.

*Primary Examiner*—James Derrington
*Attorney, Agent, or Firm*—Oblon, Spivak, McClelland, Maier & Neustadt, P.C.

[57] ABSTRACT

The present invention provides a method of producing composite oxide ceramics which is capable of efficiently producing single-phase multi-component metal oxide ceramics having less impurity phase and excellent dielectric characteristics, by a simple process comprising sintering at a low temperature. The method has the steps of mixing a metallic hydroxide or hydrous gel with a plurality of metallic oxide powders to prepare a raw material mixture powder, activating the raw material mixture powder by mechanochemical treatment for grinding the raw material mixture powder with a degree of impact, which provides a centrifugal effect of 15 or more, to form a precursor, and synthesizing composite oxide ceramics by heat treatment of the activated raw material mixture powder (precursor).

7 Claims, 10 Drawing Sheets

METHOD OF PRODUCING COMPOSITE OXIDE CERAMICS

BACKGROUND OF THE INVENTION

1. Field of the Invention

The present invention relates to a method of producing composite oxide ceramics, and particularly to a method of producing composite oxide ceramics which is capable of effectively producing single-phase multi-component composite metal oxide ceramics having excellent dielectric characteristics and the less impurity phase formed therein, by a simple process comprising sintering at a low temperature.

2. Description of the Related Art

In the present situation, ceramic capacitors comprising laminated composite oxide ceramics having a high electric capacity per unit volume and high voltage stability are widely used as electronic circuit elements of various communication apparatus and TV as integration of electronic circuits and miniaturization of electronic devices rapidly progress.

Among the composite oxide ceramics which constitute capacitors, particular attention is paid to single-phase composite oxide ceramics (simply referred to as "PMN-PT" hereinafter) containing no impurity phase such as a pyrochlore phase, which deteriorates dielectric properties, and having the composition of $Pb(Mg_{1/3}Nb_{2/3})O_3$—$PbTiO_3$, and a perovskite structure.

Such composite oxide ceramics (PMN-PT) are conventionally produced by a columbite method or molten salt method, for example, using KCl, both of which will be described below.

Columbite method (1) A mixture containing MgO powder and $Nb_2O_3$ powder is first calcined at a temperature of 1000° C. or higher for about 4 hours to prepare the precursor $MgNb_2O_6$ (magnesium niobate) referred to as "columbite" according to the following formula (1):

$$MgO + Nb_2O_5 \rightarrow MgNb_2O_6 \tag{1}$$

(2) The resultant precursor $MgNb_2O_6$, PbO and $TiO_2$ are mixed at a predetermined ratio, and, MgO is added to the mixture in an excess of 5% by weight to prepare a mixture. The MgO component promotes the formation of a single perovskite phase containing no pyrochlore phase. The thus-prepared mixture is calcined in an alumina crucible at 800° C. for 4 hours to prepare PMN-PT according to the following formulae (2) and (3):

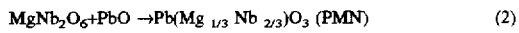

$$MgNb_2O_6 + PbO \rightarrow Pb(Mg_{1/3}Nb_{2/3})O_3 \text{ (PMN)} \tag{2}$$

$$PMN + PT \rightarrow PMN-PT \tag{3}$$

(3) The thus-obtained calcined PMN-PT is ground in a mortar, and then uniformly mixed with a 10% by weight of PVA aqueous solution. The resultant mixture is molded into a pellet having a predetermined shape. After the binder contained in this pellet is burned out, the pellet is sintered at a temperature of about 1200° C. for about 1 hour to produce PMN-PT ceramic for a capacitor.

Molten salt method using KCl (1) Predetermined amounts of PbO, MgO, $Nb_2O_5$ and $TiO_2$ powders are uniformly mixed with ethanol as a dispersion medium in an alumina mortar for tens hours, and then dried to form a mixed powder. 20 g of KCl is added to and uniformly mixed with 30 g of the mixed powder to obtain a raw material mixture. The raw material mixture is then heated in a covered alumina crucible at 900° C. for 1 hour to prepare a calcined product.

(2) The thus-obtained calcined product is soaked in boiling dilute nitric acid (a concentration of 50% by weight) to obtain a powder from which KCl added and non-reacted PbO are removed. The resultant powder is further purified by repeating washing and filtration at least five times using high-temperature deionized water. PbO is further added to the purified powder, followed by drying by a general method to prepare a PMN-PT powder.

(3) 1% by weight of stearic acid is added to the resultant PMN-PT powder to form a mixture, and a stainless die is filled with this mixture and is uniaxially pressed under a pressure of 100 MPa to form a pellet having a diameter of 10 mm and a thickness of 5 mm. The pellet is placed in a closed alumina crucible together with lead zirconate or lead zirconate containing lead oxide, and then burned at a temperature of 1000° to 1300° C. for about 15 minutes to 10 hours to produce PMN-PT ceramic for a capacitor.

However, both the above columbite method and the molten salt method using KCl have the problems that each of the methods comprises complicated steps of raw material blending, uniform dispersion and mixing, synthetic reaction, purification and post-treatment, and that processing in each of the steps requires much time, thereby decreasing the production efficiency of composite oxide ceramics. For example, in order to prepare a uniformly dispersed raw material mixture, raw material powders are ground and mixed with an alcohol used as a dispersion medium in a ball mill for a long time of 20 to 70 hours.

Such a step of grinding and mixing raw materials for a long time inevitably brings about contamination of the raw materials with abrasion powders of grinding media such as a mixing container and a ball, and thus causes an impurity phase other than the perovskite phase in a ceramic material. This finally significantly deteriorates electrical characteristics such as dielectric properties.

Even in the grinding and mixing step for a long time, since the raw material powders have low activity, proposals are made to increase the reactivity of synthetic reaction by setting a high sintering temperature, and increase the denseness of composite oxide ceramic. However, the high sintering temperature causes the easy growth of crystal grains of ceramic, and large variations in the size of crystal grains. In any case, there is the problem of deteriorating the strength characteristics and durability of the composite oxide ceramics.

In addition, the conventional methods have the need to set high calcination and sintering temperatures, and thus has the need to increase the degree of heat resistance specifications for the sintering furnace used. This causes the problems of increasing the construction cost and running cost of burning equipment, and driving up the production cost of composite oxide ceramics.

The molten salt method using KCl is difficult to completely remove the residual KCl after processing in order to form a single-phase composite oxide, and thus has the problem of significantly deteriorating dielectric characteristics due to the KCl salt remaining as an impurity in the composite oxide.

Further, in the molten salt method using KCl, since the raw materials used contain PbO which has high volatility and which evaporates at high calcination and sintering temperatures, excess PbO is previously mixed in the raw material mixture powder in view of the volatile content. However, the volatile content varies with operation conditions, and thus the stoichiometric composition of composite oxide ceramic as the final product cannot be strictly adjusted. As a result, this method also has the problem of producing only composite oxide ceramics having poor dielectric characteristics.

SUMMARY OF THE INVENTION

The present invention has been achieved for solving the above-described problems, and an object of the present invention is to provide a method of composite oxide ceramics which is capable of effectively producing single-phase multi-component composite oxide ceramics having less impurity phase formed therein and excellent dielectric characteristics, by a simple process comprising sintering at a low temperature.

In order to achieve the object, the inventors of the present invention experimentally synthesized ceramics by using various pre-treatment methods for enhancing the reactivity of a raw material mixture powder and various compounds which can form single-phase metallic oxides, and investigating electrical characteristics and purities of the synthesized ceramics by comparison.

As a result, when a raw material mixture powder obtained by mixing a metallic hydroxide or hydrous gel with a plurality of metallic oxides was subjected to mechanochemical treatment of grinding the mixture with an impact level which provides a predetermined centrifugal effect, the raw material mixture powder could be uniformly dispersed within a short time, and an activated precursor can be formed. In this experiment, various grinding and mixing devices which employ an impact medium such as beads, a ball, a ring member or the like can be used as a device for activating the raw material mixture powder by applying mechanical energy thereto. In these grinding and mixing devices, it is effective to use the centrifugal effect Z of an impact medium as a quantitative index which indicates the intensity of the grinding force (impact force) applied to the powder. The centrifugal effect Z is a value obtained by diving centrifugal force Fc of the impact medium by gravity Fg, and is represented by the following equation (4):

$$Z = \frac{Fc}{Fg} = \frac{r\omega^2}{g} \; (-) \tag{4}$$

The mechanochemical treatment with the centrifugal effect Z set to a predetermined value or more permits uniform dispersion of the raw material mixture powder within a short time, and the formation of an activated precursor. It was thus found that even when the activated raw material mixture powder (referred to as a "precursor" hereinafter) is heated at a low temperature, uniform composite oxide ceramic having excellent electrical characteristics such as dielectric properties can easily be obtained.

It was also found that even after the mechanochemical treatment, a sintering operation at a much lower temperature than a conventional method permits the easy formation of composite oxide ceramic having an uniform fine structure region in the substantially atomic level or the order of several nanometers.

It was further found that, although a raw material mixture powder obtained by a conventional simple mechanical mixing and grinding step has the tendency that an impurity phase is easily formed therein, the above-mentioned method is capable of easily producing single-phase composite oxide ceramics. The present invention has been achieved on the basis of these findings.

In accordance with an aspect of the present invention, there is provided a method of producing composite oxide ceramics comprising the steps of mixing a metallic hydroxide or hydrous gel with a plurality of metallic oxides to prepare a raw material mixture powder; activating the raw material mixture powder by mechanochemical treatment in which the raw material mixture powder is ground under conditions for providing centrifugal acceleration of at least 15 times the gravitational acceleration, to form a precursor; and synthesizing composite oxide ceramics by heating the precursor obtained by activation. The step of synthesizing the composite oxide ceramics comprises the steps of calcining, at a temperature of 400° to 900° C., the precursor obtained by activation to form a calcined product, and molding a ground powder of the calcined product and then sintering the molded product at a temperature of 1000° to 1250° C.

When a calcination temperature is lower than 400° C., the intended perovskite phase cannot be produced, while the calcination temperature is over 900° C., the crystal grain size of the composite oxide is increased, and large pores are easily formed, thereby hardly obtaining a dense sintered product. Although the calcination temperature is thus set within the range of 400° to 900° C., the calcination temperature is preferably set to 750° to 900° C. for obtaining the perovskite phase at a ratio of 90% or more.

When a sintering temperature is lower than 1000° C., the density of the composite oxide is decreased, while the sintering temperature is over 1250° C., the molded product is melted and thus difficult to maintain a predetermined shape, and defects such as discoloration occur. A sintering temperature of over 1250° C. cannot be used for composite oxide ceramics containing PbO because the components significantly vaporize. Therefore, the sintering temperature is preferably set within the range of 1000° C. to 1250° C.

The centrifugal acceleration in the mechanochemical treatment is more preferably 70 g or more, and the mechanochemical treatment time is within the range of 1 to 2 hours.

The particle size of the raw material mixture powder used as a starting material is preferably set within the range of 1 nm to 1000 μm.

The metallic oxides and the metallic hydroxide or hydrous gel comprise at least one metal element selected from tetravalent metallic elements such as Si, Ti, Zr, and the like; and at least one metal element selected from divalent metallic elements such as Mg, Ca, Sr, Pb, and the like, trivalent metallic elements such as Al, La, Y, and the like, and pentavalent metallic elements such as Nb, V and the like. A constitutive material for composite metal oxide ceramics may comprise combination of at least three metal elements selected from the above divalent to tetravalent metallic elements. Oxides and hydroxides of these metals may be used as constitutive materials for composite oxide ceramics (solid solution) having the perovskite structure which is typically expressed as $A^2+B^4+O^3$.

The metallic hydroxide having an OH group and the hydrous gel having hydroxyl groups are effective as components for enhancing the activity (reactivity) of the raw material mixture powder, and forming a pure perovskite phase. $Mg(OH)_2$ is particularly effective as the metallic hydroxide. Amorphous $TiO_2 \cdot H_2O$ is particularly effective as the hydrous gel. Although a conventional production method employs a raw material mixture powder comprising only metallic oxides as a starting material, the method has the drawback that an impurity phase such as a pyrochlore phase is easily formed, and the dielectric properties of composite oxide ceramics easily deteriorate.

In contrast, the method of the present invention in which the metallic hydroxide or hydrous gel is contained in the raw material mixture powder increases the activity of the raw material mixture powder, and can thus efficiently obtain composite oxide ceramics comprising only a single perovskite phase.

The metallic oxides, and the metallic hydroxide or hydrous gel, which constitute the raw material mixture powder, may be either crystalline or amorphous. In order to enhance the reactivity of the raw material mixture powder and obtain composite oxide ceramics having a fine structure, the particle size of the raw material mixture powder used is preferably within the range of 1 nm to 1000 μm. The raw material mixture powder having a particle size of less than 1 nm is difficult to handle, while the coarse raw material mixture powder having a particle size of over 1000 μm has difficulties in increasing the activity thereof even by the mechanochemical treatment, and the structures of composite oxide ceramics are coarsened, thereby hardly obtaining sufficient strength and dielectric characteristics.

In the step of preparing the raw material mixture powder, the metallic oxides and the metallic hydroxide or hydrous gel are weighed to obtain the stoichiometric composition of the intended final composite oxide ceramic, and then uniformly mixed. In composite oxide ceramic containing at least three metallic elements, the stoichiometric composition can be maintained, and excess PbO need not be previously contained in the raw material mixture powder in view of the volatile content.

The raw material mixture powder prepared by mixing the various oxides, as described above, is then uniformly dispersed, and subjected to mechanochemical treatment for enhancing the reactivity of the raw material mixture powder. The mechanochemical treatment is carried out for forming an active precursor by mixing and grinding the raw material mixture powder with impact force which provides the centrifugal effect (centrifugal acceleration) of a predetermined value or more on the raw material mixture powder. The mechanochemical treatment has the effect of enhancing the reactivity of the surfaces of the raw material mixture powder by producing strains and defects in the crystal structure and crystal arrangement of the surfaces of the raw material mixture powder due to the impact force.

A vibrating ball mill or planetary ball mill is possibly used as a grinding device for performing the mechanochemical treatment. Although such a grinding device is difficult to provide the raw material mixture powder with sufficient reactivity by processing for a short time, for example, about 1 hour, because the device has a relatively small centrifugal effect Z, reactivity can be applied to the raw material mixture powder by processing for 2 to several hours. Various impact grinding machines and powder surface modifying devices which can repeatedly apply compressive/shear stress to the raw material mixture powder within a short time can also be used.

In the mechanochemical treatment, the centrifugal effect (centrifugal acceleration) Z applied to the raw material mixture powder must be at least 15. When the centrifugal effect is less than 15, the impact force applied to the raw material mixture powder is insufficient, and it is thus difficult to enhance the reactivity by producing strains in the crystal structure of the particle surfaces within a short time. In order to enhance the reactivity of the raw material mixture powder within a short time and prepare the uniform raw material mixture powder, therefore, it is necessary to use a grinding device which can apply impact force so that the centrifugal effect is 15 or more, preferably 70 or more, more preferably 150 or more.

The method of the present invention therefore uses such a micronizer (multi-ring type pulverizing mill) as shown in FIGS. 1 and 2 as the grinding device for carrying out the mechanochemical treatment. This device is capable of applying impact force and friction to powder particles so as to enhance the reactivity thereof, and efficiently mixing and grinding the powder particles within a short time. The device comprises a cylindrical casing 1, a main shaft 4 which is rotated in the casing 1, and a plurality of sub-shafts 6 which are rotated around the main shaft 4 in linkage with the rotation of the main shaft 4, each of the sub-shafts 6 being provided with many ring members 9 as grinding media. Although the size of each of the ring members 9 as the grinding media depends upon the size of the treatment device used, the outer diameter is 25 to 45 mm, and the thickness is several mm. Although the material for the ring members 9 depends upon the physical properties of a material to be processed, the ring members 9 comprise a ceramic material such as stainless steel, alumina, zirconia or the like, or a carbide material such as WC.

The casing 1 has an internal peripheral surface 2 having a longitudinal axis, and a rotational mechanism 3 provided in the casing 1 serving as a processing chamber. The rotational mechanism 3 comprises the main shaft 4 concentric with the casing 1, a pair of press plates 5 and 5' which are fixed at a predetermined interval therebetween in the longitudinal direction of the main shaft 4, and the sub-shafts 6 which are fixed by the press plates 5 and 5' so as to be arranged at the same distance from the main shaft 4 in parallel therewith.

Each of the press plates 5 and 5' has a form in which the same number of arms as the number of the sub-shafts 6 are radially projected. The form of the press plates 5 and 5' in which the arms are provided at equal intervals, not a simple disk form, can improve the degree of convection (mixing) of a material to be processed, which is put into the casing 1, and decrease as much as possible the amount of the material to be processed, which is deposited as a dead stock on the upper press plate 5.

Each of the sub-shafts 6 comprises a long bolt-like member having ends which are respectively passed through holes provided at the ends of the arms of both press plates 5 and 5' and tightened by nuts 7. The upper end of the main shaft 4 is connected directly to a driving source such as a motor (not shown) or provided with a pulley so that the rotational force of the driving source is transmitted to the main shaft 4 through a V belt.

As shown in FIG. 2, a cylindrical collar 8 is fitted on each of the sub-shafts 6 with a small gap therebetween, and a plurality of ring members 9 are rotatably mounted on each of the collar 8. Each of the ring members 9 has an internal diameter sufficiently larger than the outer diameter of the collar 8, and is constructed so as to have a sufficient gap between the internal peripheral surface of the ring member 9 and the external peripheral surface of the collar 8 when the external peripheral surface of the ring member 9 contacts the internal peripheral surface 2 of the casing 1.

The ring members 9 are stacked to form a gap corresponding to the total thickness of 2 to 3 ring members 9 between the upper side of the uppermost ring member 9 and the lower side of the press plate 5, but not closely stacked between both press plates 5 and 5' without a gap. This stacking structure makes the ring members 9 rotatable around each of the collars 8.

Each of the ring members 9 is formed in a cylindrical form having parallel upper and lower surfaces, which is a so-called washer-like form having smooth upper and lower surfaces, and an outer peripheral surface. If required, the outer peripheral surface may be curved for promoting bite into the powder material.

Agitating blades 10 and 10' are radially disposed at upper and lower portions of the main shaft 4, which are below the lower press plate 5' and above the upper press plate 5, respectively, so as to agitate the material to be processed, which is put into the casing 1.

To an upper flange 13 of the casing 1 is fixed an upper cover 11 having a through hole by tightening members such as bolts and nuts, with a packing 12 therebetween. The main shaft 4 is passed through the through hole of the upper cover 11, the through hole being provided with an oil seal 14 for sealing the main shaft 4, and an oil seal holder 15 for holding the oil seal 14. In order to prevent a temperature rise of the material to be processed during grinding, the side of the casing 1 has a jacket structure 16. A refrigerant supply port 17 and discharge port 18 are provided in the jacket 16 so that the material to be processed which is put into the casing 1 can be cooled by continuously supplying any one of various refrigerants into the jacket 16.

In the grinding device (micronizer) constructed as described above, a gap of several mm is formed between the outer periphery of each of the sub-shafts 6 and the inner peripheries of the ring members 9 so that the ring members 9 can be freely independently rotated. The ring members 9 serving as the grinding media are radially moved by an amount corresponding to the gap due to the centrifugal force generated by the rotating of the main shaft 4, and circumferentially rotated in the casing 1 while being pressed on the inner periphery 2 of the casing 1. At the same time, the ring members 9 themselves are rotated around the sub-shafts 6 due to the friction between the inner peripheral surface 2 and the ring members 9. Namely, the ring members 9 are moved in the casing 1 while being repeatedly rotated around the main shaft 4 and each of the sub-shafts 6.

When the raw material mixture powder in an amount corresponding to 10 to 80% of the effective volume of the grinding portion is put into the casing 1 and then subjected to the mechanochemical treatment by rotating the main shaft 4, the raw material mixture powder is held between the rotating ring members 9 and the internal peripheral surface 2 of the casing 1, and subjected to impact force (compressive/shear force) corresponding to the centrifugal effect caused by the ring members 9 and the grinding function due to the rotation of the ring members 9 themselves. As a result, the raw material mixture powder is ground and dispersed, and, at the same time, strains are produced in the crystal structure of the particle surfaces of the mixture powder to form a precursor in which the reactivity of the surfaces of the raw material mixture powder is enhanced. The centrifugal effect exerted on the raw material mixture powder is controlled by changing the rotational speed of the main shaft 4.

The raw material mixture powder (precursor) activated by the mechanochemical treatment, as described above, is heated according to the procedure below to synthesize composite oxide ceramics. The activated raw material mixture powder (precursor) is first calcined at a temperature of 400° to 900° C. for 2 to 8 hours to form a calcined product. In this calcination step, solid phase reaction proceeds to produce a perovskite type oxide from a solid solution of the starting material.

However, the perovskite type oxide produced by calcination has a state wherein many particles coagulate to form coarse particles, and pores and calcination irregularities also occur. Since the perovskite type oxide in this state has insufficient strength and dielectric characteristics, the calcined product must be ground to remove calcination irregularities and variations in the particle size.

A polyvinyl alcohol (PVA) aqueous solution as a binder is then added to the grinding machine to form a granulated powder. The thus-granulated powder is charged in a die and pressed to form a molded product (molded compact) having a predetermined shape. After the molded product is then heated to 400° to 500° C. in air to remove the binder component from the product, the product and a $PbZrO_3$ powder for adjusting atmosphere are placed in a heating oven, heated at a rate of temperature rise of 3° to 6° C./min, and sintered or burned at a temperature of 1000° C. to 1250° C. for 0.5 to 2 hours.

In this sintering or burning step, dense composite oxide ceramic having less composition irregularity and pores, and a fine crystal structure is prepared. Since an atmosphere of PbO is produced by burning the product together with $PbZrO_3$ powder for adjusting atmosphere, vaporization of PbO as a constitutive raw material of the composite oxide ceramic is effectively suppressed. Therefore, composite oxide ceramic having less deviation from the intended stoichiometric composition can be obtained. In this way, even in composite oxide ceramic comprising at least three metallic elements, the stoichiometric composition can be maintained, and excess PbO need not be previously mixed in the raw material mixture powder in view of the volatile content.

In the method of producing composite oxide ceramics of the present invention, the mechanochemical treatment, in which the raw material mixture powder as the starting material is ground with an impact which provides the powder with the centrifugal effect of at least 15, can uniformly disperse the raw material mixture powder within a short time and significantly enhance the reactivity. Since the raw material mixture powder is activated, the reaction rate is increased even by heat treatment at a low temperature, thereby accelerating the formation of a single phase. As a result, composite oxide ceramic having a single phase perovskite structure and less impurity phase formed therein can efficiently be produced.

Although a conventional simple process of mechanically mixing and grinding a raw material requires several tens hours for obtaining an uniformly dispersed raw material mixture powder, the mechanochemical treatment for providing a centrifugal effect of 70 or more permits uniform dispersion of the raw material mixture powder within a short time of 1 to 2 hours and the production of a precursor by activation.

Further, since the processing time is short, as described above, the amounts of contaminants to be mixed in the raw material mixture powder are decreased, thereby obtaining composite oxide ceramic with high purity. In addition, since the resultant composite oxide ceramic has less pores and a homogeneous fine structure comprising a high-purity single-phase perovskite phase, the electrical characteristics of the ceramic such as dielectric constant are significantly improved.

Furthermore, since the use of the precursor obtained by activation permits the sintering operation at a lower temperature than a conventional method, the growth of crystal grains is effectively suppressed during sintering, thereby obtaining a fine structure comprising only fine crystal grains. The composite oxide ceramic material has high strength, and thus excellent durability and structural strength.

9

Further, since the calcination and sintering temperatures can be set to lower values, the heat resistance specifications of an apparatus such as the sintering furnace need not be made strict, thereby permitting the use of a burning or sintering apparatus with low construction cost, and a decrease in the running cost of the apparatus used. It is thus possible to reduce the production cost of the composite oxide ceramics.

Since each of the steps of uniform dispersion, mechanochemical treatment, and calcination and sintering is simplified, and the processing time is short, the production efficiency of composite oxide ceramics can significantly be improved.

PREFERRED EMBODIMENTS OF THE PRESENT INVENTION

An embodiment of the present invention is described in detail below with reference to examples and the drawings.

EXAMPLES 1 to 6

Metallic oxide powders and metallic hydroxide powder having the analytical reagent grade of purities, which are shown in Table 1 below, were prepared as raw material powders for producing composite oxide ceramics having the stoichiometric composition of $0.9Pb(Mg_{1/3}Nb_{2/3})O_3$-$0.1PbTiO_3$.

10

TABLE 1

| Raw Material Powder | Purity (%) | Remarks |
| --- | --- | --- |
| PbO | 99.9 | Produced by Soegawa Rikagaku K.K. |
| Mg(OH)$_2$ | 95.4 | Produced by Koso Kagaku-Yakuhin K.K. |
| Nb$_2$O$_5$ | 99.9 | Produced by Wako Junyaku-Kogyo K.K. |
| TiO$_2$ | 98 | Produced by Ishihara Sangyo K.K. Trade Name: A-100 (anatase type) |

Each of the raw material powders was weighed at the molar ratio and the ratio by weight shown in Table 2 below so as to form the above stoichiometric composition, and cyclohexane as a dispersion medium was then mixed with the raw material powders in an agate mortar for 5 minutes. The solvent was removed by drying the resultant mixture at a temperature of 50° C. to prepare a raw material mixture powder for examples.

TABLE 2

|  | PbO | Mg(OH)$_2$ | Nb$_2$O$_5$ | TiO$_2$ |
| --- | --- | --- | --- | --- |
| Molar Ratio | 1.0 | 0.3 | 0.3 | 0.1 |
| Ratio by Weight (g) | 20.323 | 1.669 | 7.262 | 0.942 |

Figure 1:
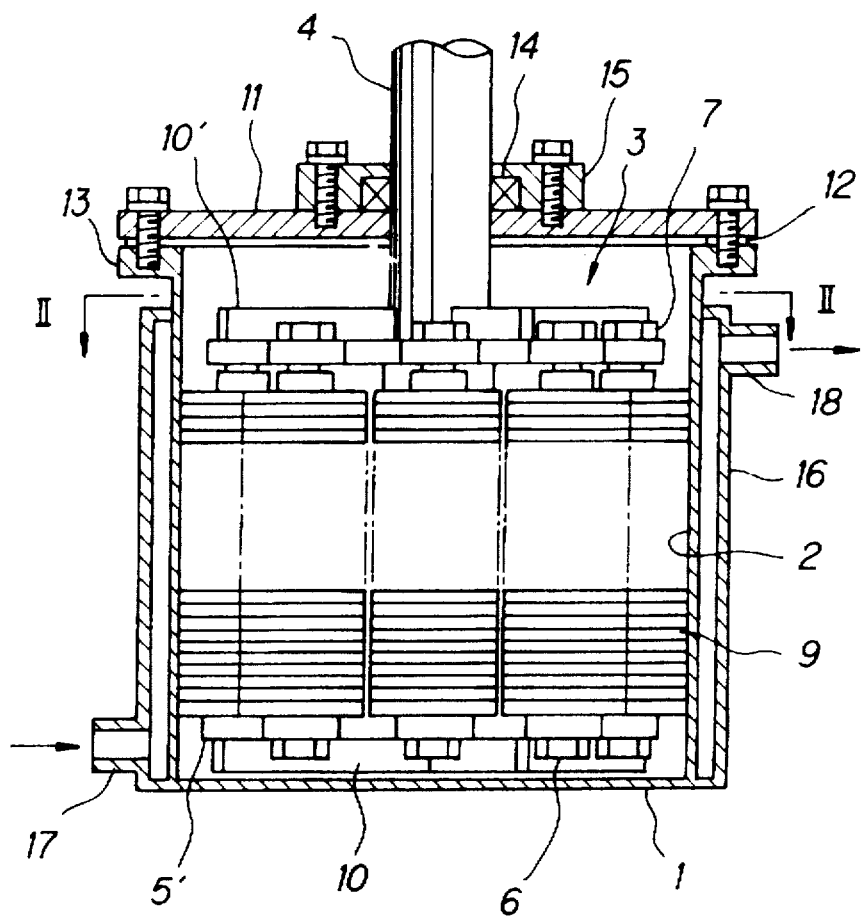
FIG. 1 is a sectional view illustrating the construction of a grinding apparatus (micronizer) used in a method of the present invention.
Figure 2:
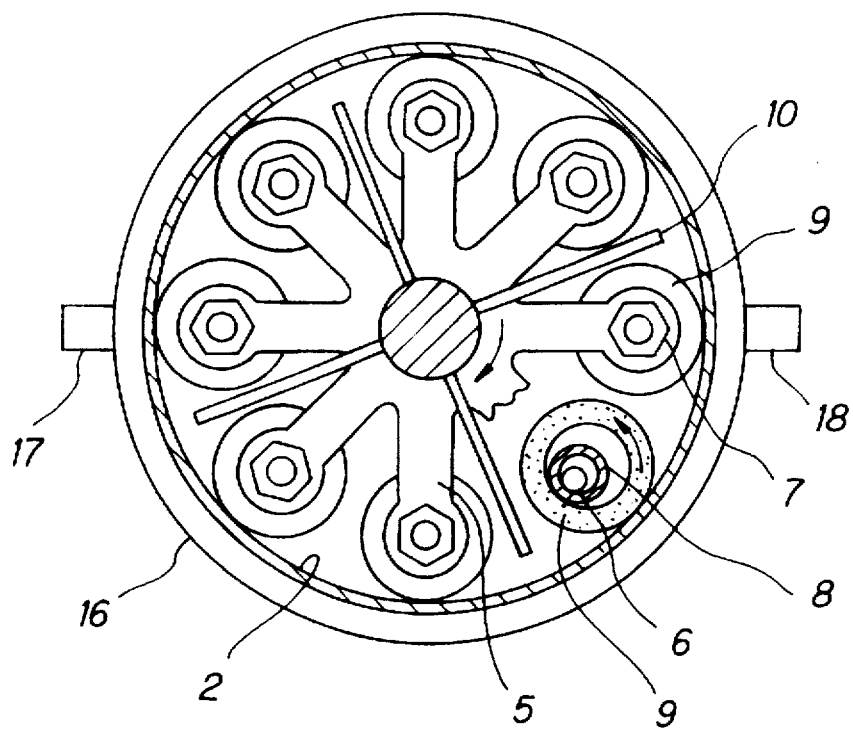
FIG. 2 is a sectional view taken along line II—II in FIG. 1.

The thus-prepared raw material mixture powder was then subjected to mechanochemical treatment using the micronizer (multi-ring type mill) shown in FIGS. 1 and 2 as a grinding apparatus to prepare a precursor. The specifications and operating conditions of the micronizer used were as follows:

Micronizer (manufactured by Nara Machinery Co., Ltd., MICROS-O Model)

Total volume of the casing: 0.74 liter

Effective volume of the grinding portion: 0.45 liter

Internal diameter of the casing: 87 mm

Grinding amount: 100 g

Rotational speed of the main shaft: 1850 rpm

Peripheral speed of the ring members: 8.4 m/sec

Grinding time: 60 min.

Centrifugal effect: 180 g

In the above mechanochemical treatment, the reactivity of the raw material mixture powder was increased, and, at the same time, the raw material mixture powder was uniformly mixed and dispersed thereby to obtain the precursor.

30g of activated precursor was placed in each of covered alumina crucibles, and heated to 850° C. at a rate of temperature rise of 10° C. /min and then maintained at that temperature for 4 hours to prepare calcined products. The heating operation was carried out by using an electric furnace (High-temperature and rapid sintering furnace: MSF. 1530. R. P. manufactured by Yamada Electric Co., Ltd.).

After each of the calcined products was lightly ground in an agate mortar to remove calcination irregularities and variations in the grain size, a 5% by weight of polyvinyl alcohol (PVA) aqueous solution was added as a binder to the ground powder to form a granulated powder. Then, thus obtained granulated powder was charged in a molding apparatus (manufactured by Mori Shikenki Seisakusho Co., Ltd., MAC-50 compression tester) comprising a die having a diameter of 12 mm and molded under a uniaxial pressure of 250 MPa for 2 minutes thereby to prepare a plurality of pellets having a diameter of 12 mm and a weight of 1.24 g.

Each of the thus-prepared pellets was heated at 500° C. in air and maintained for 4 hours for burning out the binder to obtain a product (degreased body) from which the binder was removed.

Figure 3:
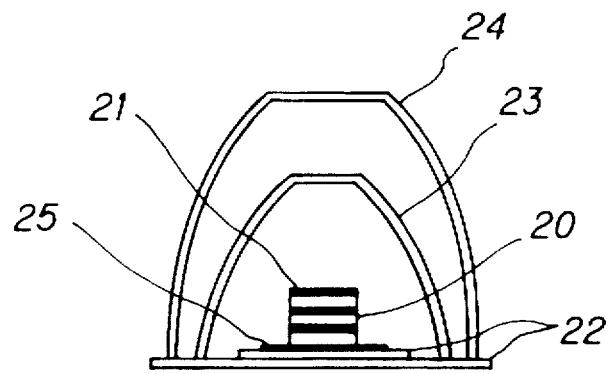
FIG. 3 is a sectional view illustrating a method of burning or degreasing a product obtained by burning a binder out.

Then, as shown in FIG. 3, the resultant products 20 and PbZrO$_3$ powders 21 for controlling the atmosphere were alternately stacked, and placed on a Pt plate 25 in a double-structure sintering container comprising two magnesia plates 22 and a magnesia crucible 23 and an alumina crucible 24. The sintering container, in which the laminate holding the PbZrO$_3$ powders 21 therein was placed, was placed in the electric furnace, and sintered under the following temperature conditions: The rate of temperature rise was set to 5° C. /min. and the sintering temperature was set to 1000° C. (Example 1), 1050° C. (Example 2), 1100° C. (Example 3), 1150° C. (Example 4), 1200° C. (Example 5), and 1250° C. (Example 6). The laminate was sintered by maintaining at the respective sintering temperatures for 2 hours to produce composite oxide ceramics of Examples 1 to 6.

Since the laminate holding the PbZrO$_3$ powders 21 therein was sintered in the closed sintering container, as described above, evaporation of PbO was effectively suppressed during the sintering operation at high temperatures, and composite oxide ceramic sintered products having substantially the same as the intended stoichiometric composition could thus be obtained.

COMPARATIVE EXAMPLES 1 to 6

On the other hand, a raw material mixture was calcined, molded, burned and then sintered under the same conditions as in Examples 1 to 6 except that a raw material mixture powder was not subjected to mechanochemical treatment, thereby to prepare composite oxide ceramic sintered products of Comparative Examples 1 to 6.

EXAMPLE 7 and COMPARATIVE EXAMPLE 7

In order to examine the dependence of the amount of the perovskite phase produced on the calcination temperature and the calcination time, the raw material mixture powder subjected to mechanochemical treatment in Example 1 and the raw material mixture powder not subjected to mechanochemical treatment in Comparative Example 1 were calcined at a calcination temperature for a time, which were changed within a range of 750° to 900° C. and 2 to 8 hours, respectively, as shown in Table 3, thereby to prepare calcined products of Example 7 and Comparative Example 7. Evaluation Each of the calcined products of Example 7 and Comparative Example 7 prepared as described above was subjected to phase analysis (identification of the phase) using powder X-ray diffractometry (XRD) using Cu-Kα rays. The measurement conditions of the X-ray diffraction apparatus used (manufactured by Rigakudenki Co., Ltd., RAD-C Model) were as follows.

Target: Cu
Filter: monochromator
Voltage: 40 kV
Current: 60 mA
Scanning speed: 5 degree/min
Scattering slit: 1 degree
Divergent slit: 0.3 degree
Receiving slit: 1 degree In the phase analysis by XRD, the maximum intensity $I_{(222)pyrochlore}$ of diffracted X-rays of the pyrochlore phase and the maximum intensity $I_{(110)perovskite}$ of diffracted X-rays of the perovskite phase were measured, and the relative ratio of the perovskite phase was calculated according to the following equation (5).

$$\text{Ratio of perovskite} = \frac{I_{(110)perovskite}}{I_{(222)pyrochlore} + I_{(110)perovskite}} \times 100 \text{ phase}(\%)$$

The results of the phase analysis are shown in Table 3 hereunder.

TABLE 3

| Calcination Conditions | Ratio of Perovskite Phase (%) | |
|---|---|---|
| Temperature(°C.) - Time (Hr) | Comparative Example 7 | Example 7 |
| 750 - 2 h | 8 | 91 |
| 750 - 4 h | 17 | 95 |
| 750 - 8 h | 6 | 96 |
| 850 - 2 h | 17 | 98 |
| 850 - 4 h | 25 | 100 |
| 850 - 8 h | 29 | 100 |
| 900 - 2 h | 38 | 100 |

The results shown in Table 3 reveal that the ratio of the perovskite phase of the calcined product of Example 7 formed by using the raw material mixture powder (precursor), which was subjected to mechanochemical treatment, increases as the calcination temperature increases. Particularly, it was found that single-phase composite oxide ceramics can be obtained by heating at 850° C. for 4 hours or more.

On the other hand, in Comparative Example 7 using the raw material mixture powder (precursor), which was not subjected to mechanochemical treatment, the ratio of the perovskite phase produced was only 38%, the remaining 60% or more comprised the pyrochlore phase, and thus the calcined product of Comparative Example 7 contained a large amount of impurity phase. Therefore, the mechanochemical treatment could be confirmed to be effective to form a single-phase calcined product.

Figure 5:
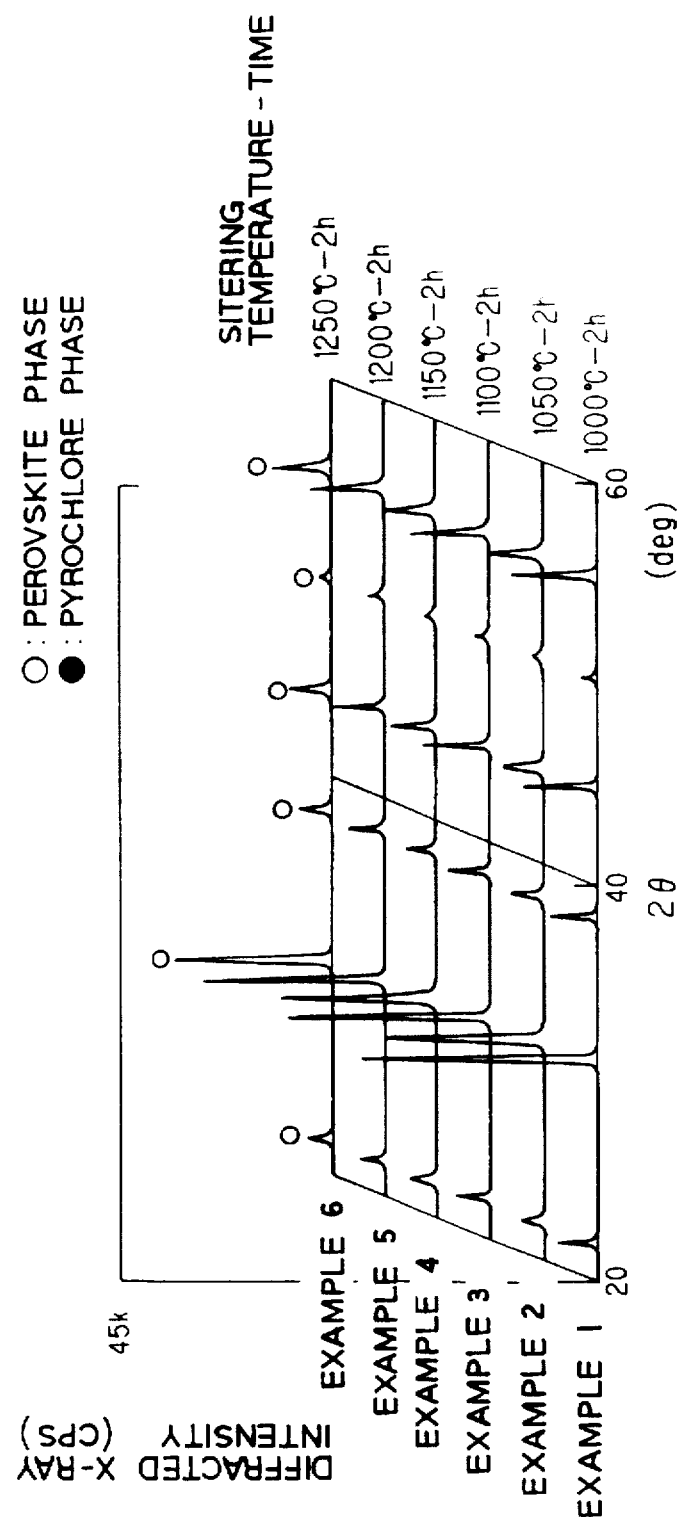
FIG. 5 is a graph showing the intensities of diffracted X-rays produced by X-ray diffraction of ceramics of Examples 1 to 6.
Figure 6:
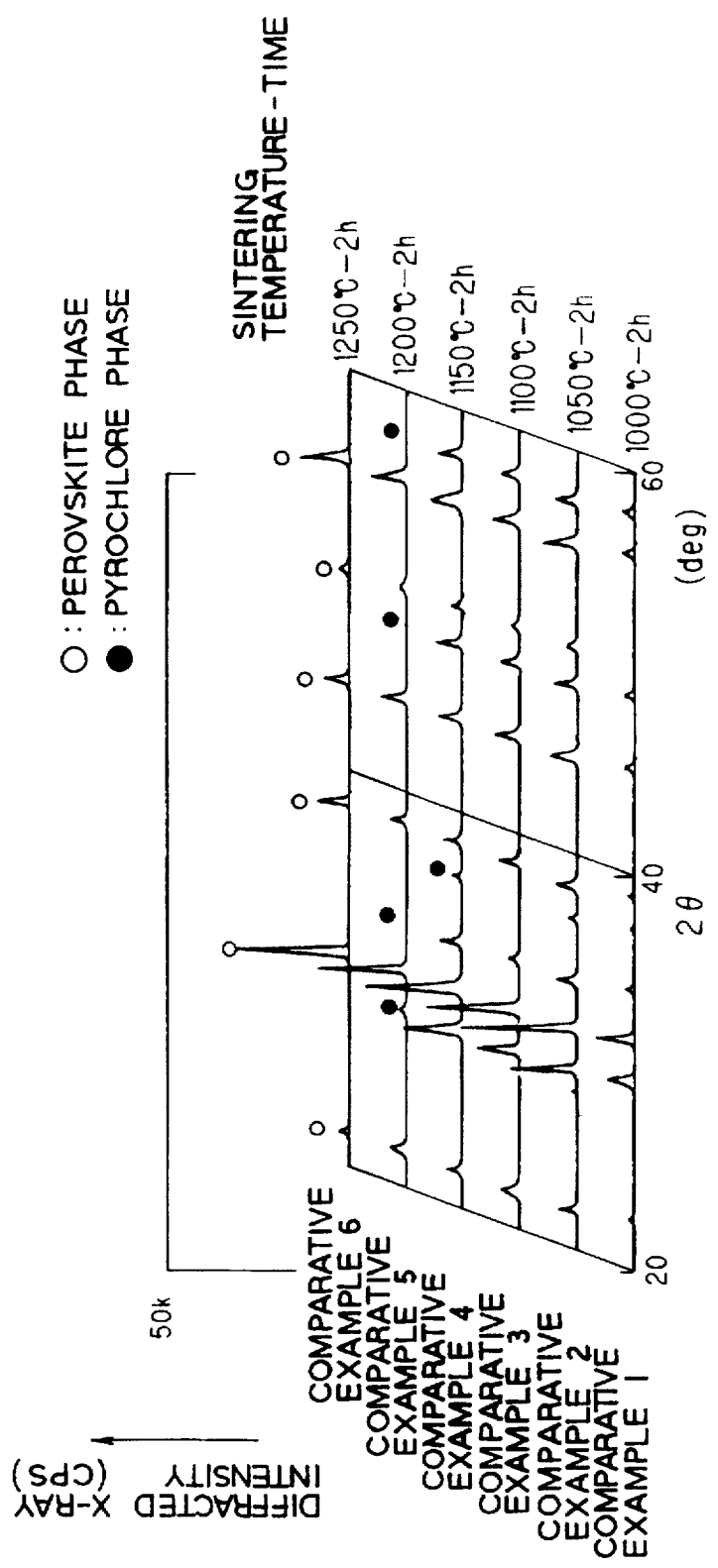
FIG. 6 is a graph showing the intensities of diffracted X-rays produced by X-ray diffraction of ceramics of Comparative Examples 1 to 6.

The composite oxide ceramics of Examples 1 to 6 and Comparative Examples 1 to 6 prepared as described above were also subjected to phase analysis using X-ray diffractometry in the same manner as described above. FIGS. 5 and 6 are graphs showing the intensity peaks of diffracted X-rays (CPS) obtained by X-ray diffraction of the ceramic sintered products of Examples 1 to 6 and Comparative Examples 1 to 6, respectively.

The results shown in FIG. 5 reveal that all ceramics of Examples 1 to 6, each of which was formed by calcining, at 850° C. for 4 hours, the precursor activated by mechanochemical treatment, and further molding and sintering the calcined product, comprise a single-phase perovskite structure when the sintering temperature was within the range of 1000° C. to 1250° C. including a low-temperature range.

In contrast, the results shown in FIG. 6 reveal that, in the ceramics of Comparative Examples 1 to 6, which were formed by using the raw material mixture powder not subjected to mechanochemical treatment, the pyrochlore phase is easily formed as an impurity phase even when the calcination conditions are set to the same as Examples. Namely, although the ratio of the perovskite phase produced tends to increase as the sintering temperature rises, single-phase ceramics comprising only the perovskite phase can be obtained only when the sintering temperature is set to a temperature of as high as 1250° C.

It was proved by these findings that the mechanochemical treatment has the effect of accelerating the reaction for forming a single-phase perovskite structure during sintering. The mechanochemical treatment also decreases the conventional sintering temperature required for forming a single-phase perovskite structure by at least about 250° C.

Figure 7:
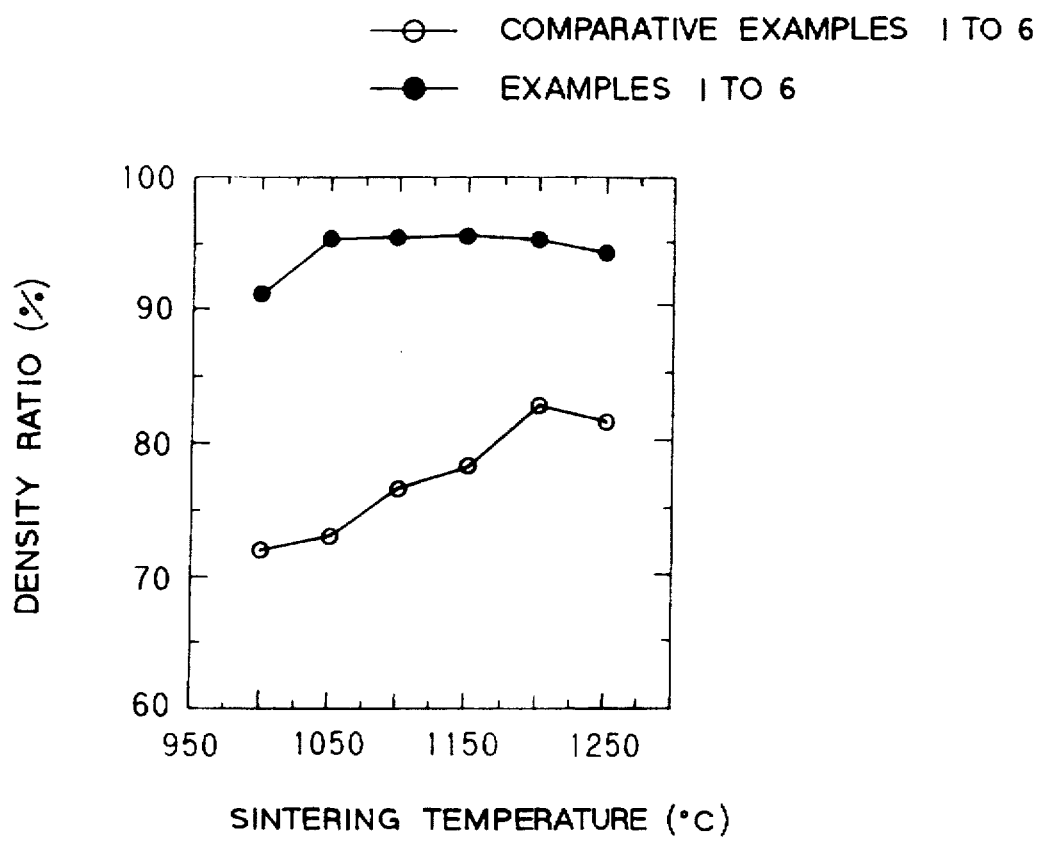
FIG. 7 is a graph showing the relations between the density ratio and the sintering temperature of ceramics of Examples and Comparative Examples.

FIG. 7 is a graph showing the relationships between the sintering temperature and the percentage (relative density, density ratio) of the measured density to the theoretical density of the ceramics of Examples 1 to 6 and Comparative Examples 1 to 6. In the ceramics of Examples 1 to 6 which were formed by using the raw material mixture powder subjected to the mechanochemical treatment, although the relative density increases from 91% to 95% as the sintering temperature rises from 1000° C. to 1050° C., the relative density is as high as about 95% within a higher sintering temperature range to 1250° C.

On the other hand, in the ceramics of Comparative Examples 1 to 6 which were not subjected to the mechanochemical treatment, although the density ratio tends to increase as the sintering temperature rises, densification does not sufficiently proceed due to low reactivity, resulting in low density ratios of 83% or less in all Comparative Examples.

The mechanochemical treatment thus permits the achievement of a homogeneous and fine ceramic crystal structure having less pores and a high density, and is thus capable of significantly improving strength and dielectric properties, as compared with conventional ceramic materials.

Figure 4:
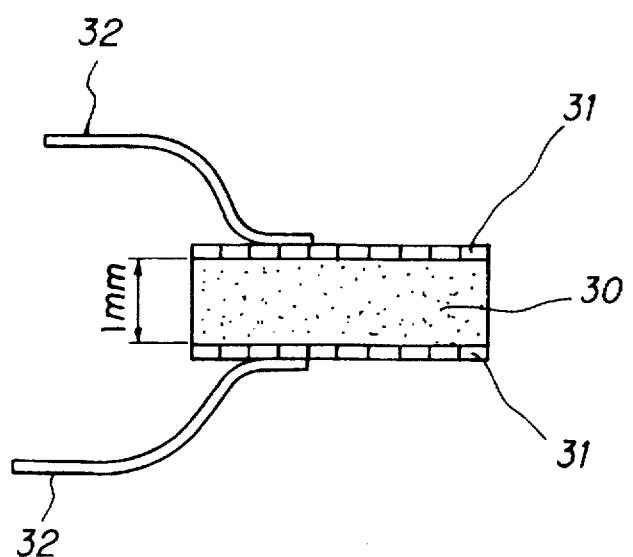
FIG. 4 is a sectional view of a capacitor sample comprising composite oxide ceramic used as a dielectric material.

In order to measure and evaluate the dielectric characteristics of the ceramics prepared in the examples and the comparative examples, such a capacitor sample as shown in FIG. 4, which comprised each of the ceramics as a dielectric material, was prepared.

Namely, the pellet-formed composite oxide ceramic sintered product prepared in each of Examples 1 to 6 and Comparative Examples 1 to 6 was ground to a thickness of 1 mm to form a dielectric material 30. Silver paste (A-2735, produced by N. E.-Chem. Cat Co., Ltd.) 31 was coated on both sides of the dielectric material 30, and a silver wire (401385, produced by Nikora Co., Ltd.) 32 having a diameter of 0.1 mm and a length of 2 cm was pressure-welded to the silver paste, and heated at a temperature of 550° C. for 20 minutes to harden the silver paste 31. As a result, the capacitor sample comprising lead wires, silver electrodes and the dielectric material 30, which were integrally provided, was prepared.

The dielectric characteristics of each of the capacitor samples were measured by a four-terminal pair AC impedance measurement method. The dielectric constant and dielectric loss of each of the dielectric materials were measured by using a vector impedance analyzer (produced by YHP Co., 4192A Model) within the temperature range of −35° C. to +120° C. with five frequency values of 1, 10, 100 and 500 KHz and 1 MHz.

Figure 8:
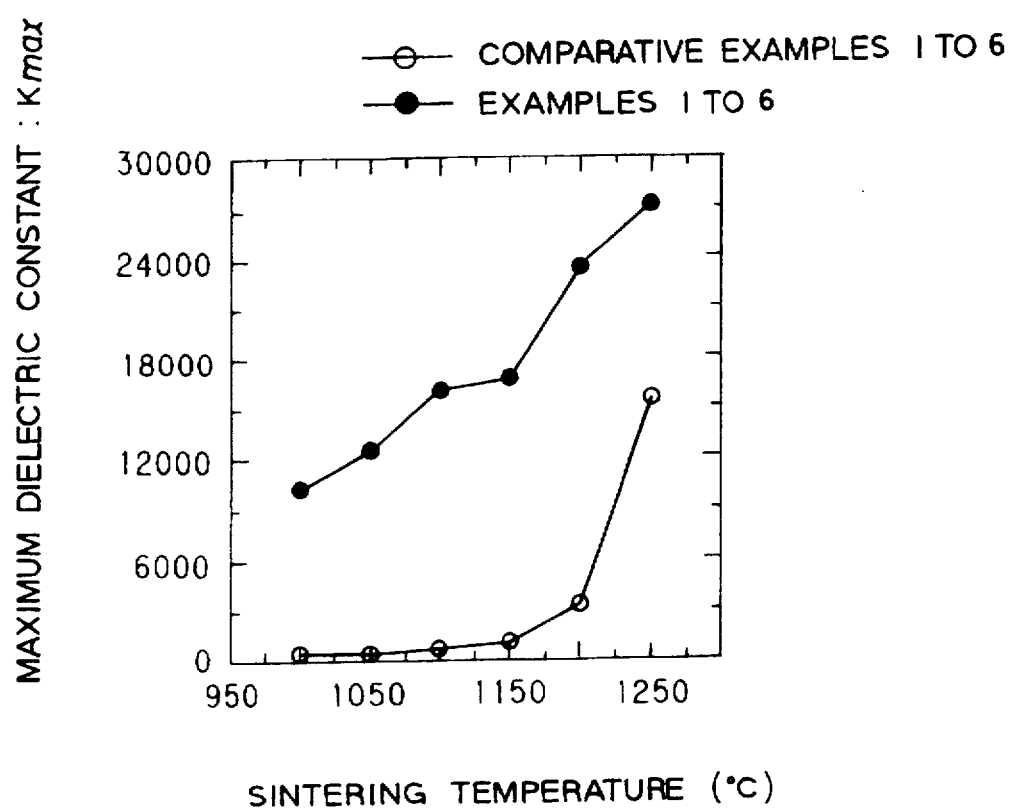
FIG. 8 is a graph showing the relationship between the maximum dielectric constant and the sintering temperature of ceramics of Examples and Comparative Examples.

FIG. 8 is a graph showing the relationships between the sintering temperature and the maximum dielectric constant (Kmax) with 1 KHz of the composite oxide ceramics of Examples 1 to 6 and Comparative Examples 1 to 6. FIG. 8 indicates the tendency that, in both the examples and comparative examples, the maximum dielectric constant (Kmax) increases as the sintering temperature rises. However, in the ceramics of Comparative Examples 1 to 5, which were formed by using the raw material mixture powder not subjected to the mechanochemical treatment, the Kmax value hardly increases within the sintering temperature range of 1000° C. to 1200° C., and the ceramic of Comparative Example 6 formed by sintering at a high temperature of 1250° C. shows an abrupt increase in Kmax value. It is thought from comparison between the XRD peaks shown in FIGS. 5 and 6 that this abrupt increase in Kmax is due to the formation of a single perovskite phase in the ceramic from which the pyrochlore phase as an impurity phase is completely removed.

On the other hand, the ceramics of Examples 1 to 6 formed by using the precursor which was subjected to the mechanochemical treatment show high dielectric constants even at low sintering temperatures, a substantially linear increase in Kmax value as the sintering temperature increases, and a Kmax value of as high as 27200 at the sintering temperature of 1250° C. The main cause of such an increase in Kmax value is thought to be that crystal grains are coarsened due to grain growth as the sintering temperature increases. It was confirmed from comparison between the sintering temperature and the sintering time that the sintering temperature has greater influences on the growth of crystal grains.

As described above, in the comparative examples without mechanochemical treatment, the Kmax value was hundreds to about 10000 within the sintering temperature range of 1000° C. to 1250° C., while in the examples with mechanochemical treatment, a high Kmax value of tens of thousands was obtained even within a low sintering temperature range. It was thus found that the mechanochemical treatment is significantly effective to improve dielectric characteristics.

Figure 9:
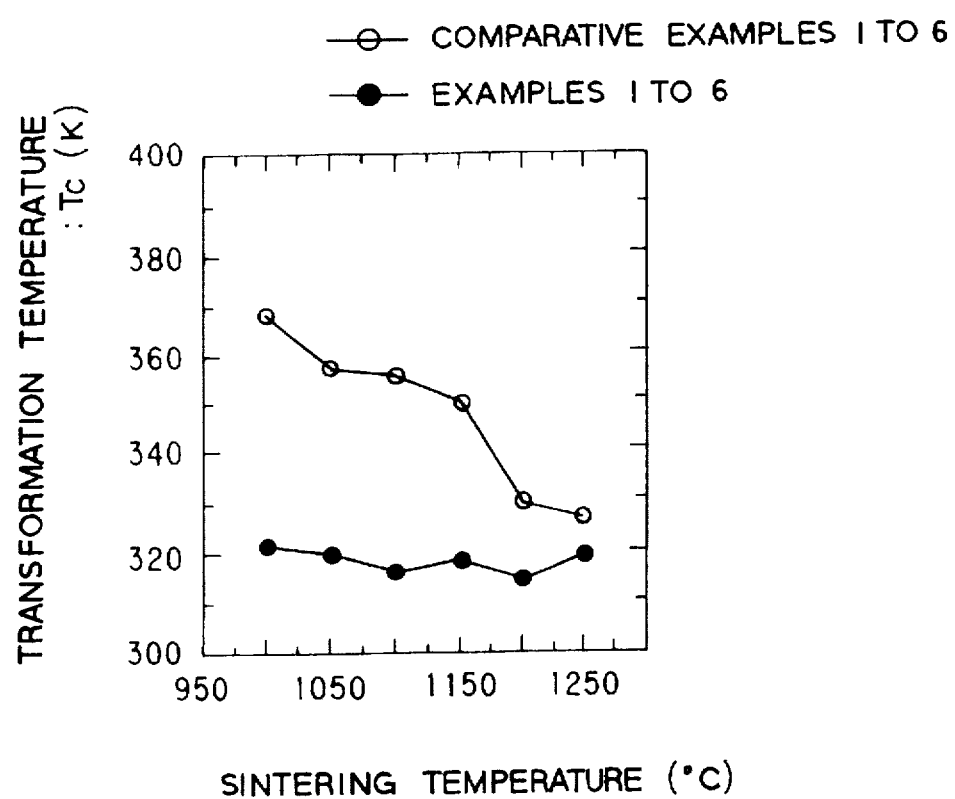
FIG. 9 is a graph showing the relations between the transformation temperature and the sintering temperature of ceramics of Examples and Comparative Examples.

FIG. 9 is a graph showing the relationships between the sintering temperature and the transformation temperature (Curie temperature) Tc of the ceramics of the examples and the comparative examples. FIG. 9 indicates that, in Examples 1 to 6 with mechanochemical treatment, the transformation temperature Tc slightly decreases even by increasing the sintering temperature.

On the other hand, in Comparative Examples 1 to 6 without mechanochemical treatment, the transformation temperature Tc abruptly decreases as increasing the sintering temperature. As the sintering temperature is raised, the Kmax value is increased due to the significant growth of crystal grains, while the transformation temperature Tc is decreased.

The transformation temperature Tc is a factor which changes with the compositions of composite oxide ceramics. In the ceramics of the examples, since the calcined product has 100% of the perovskite phase, the transformation temperature hardly changes with changes in the sintering temperature. On the other hand, in the ceramics of the comparative examples, since the calcined product has a low ratio of perovskite phase, an increase in the sintering temperature causes the tendency that the ratio of the perovskite phase increases, accompanied with a decrease in the transformation temperature. In this way, the mechanochemical treatment can stabilize the transformation temperature of the ceramic obtained.

As described above, in the ceramics of the examples, since the calcined product has a high ratio of the perovskite phase, the crystal grains uniformly grow during sintering. On the other hand, the ceramics of the comparative examples have the fault that, since the growth of the crystal grains starts after the pyrochlore phase is changed to the perovskite phase during sintering due to a low ratio of the perovskite phase, the crystal grain size becomes nonuniform.

Figure 10:
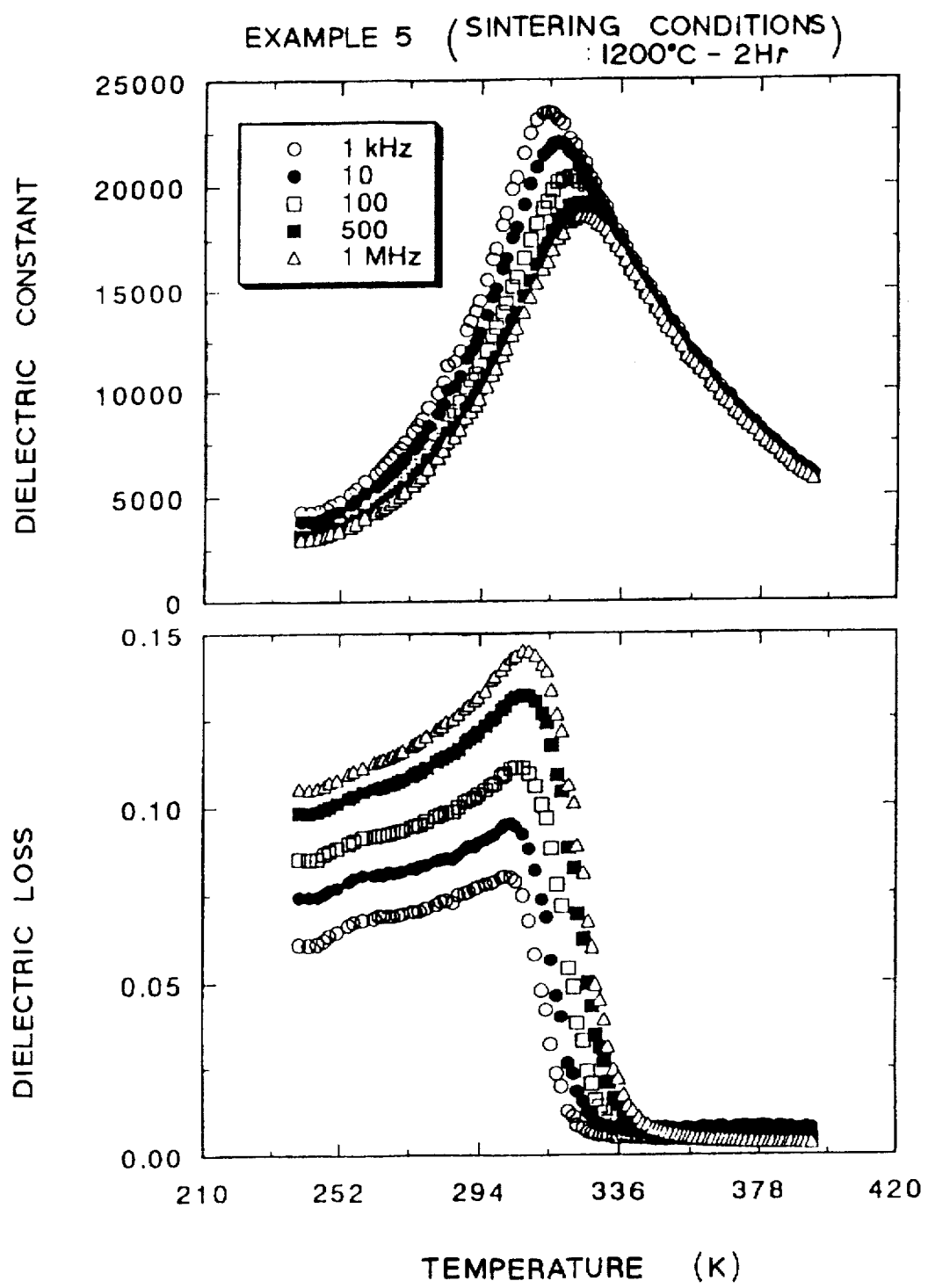
FIG. 10 is a graph showing the relations between the dielectric constant, the dielectric loss and the temperature of ceramic of Example 5.

FIG. 10 is a graph showing the relations between dielectric constant, dielectric loss and temperature of the composite oxide ceramic of Example 5 (sintering conditions: 1200°

Figure 11:
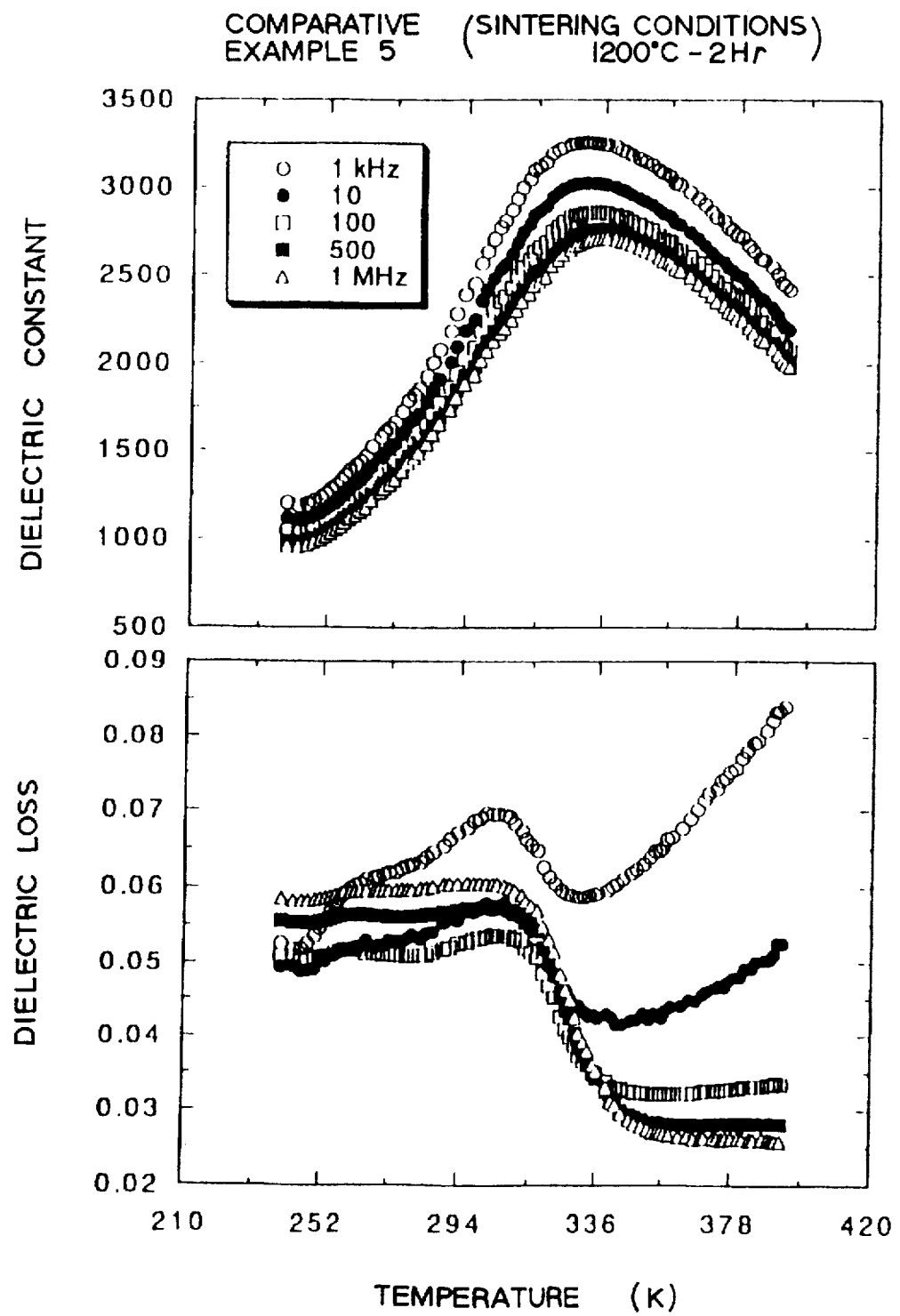
FIG. 11 is a graph showing the relations between the dielectric constant, the dielectric loss and the temperature of ceramic of Comparative Example 5.

C. -2 Hr), which was formed by using the raw material mixture powder (precursor) subjected to the mechanochemical treatment, with the frequency as a parameter. FIG. 11 is a graph showing the relations between dielectric constant, dielectric loss and temperature of the composite oxide ceramics of Comparative Example 5 (sintering conditions: 1200° C. -2 Hr), which were formed by using the raw material mixture powder (precursor) not subjected to the mechanochemical treatment, with the frequency as a parameter.

FIG. 10 indicates that the ceramics of Example 5 formed by the process comprising the mechanochemical treatment exhibit a typical behavior, i.e., the characteristic of a ferroelectric relaxer (relaxer ferroelectric behavior), in which the transformation temperature indicating the maximum dielectric constant is shifted to the higher temperature side with increases in the frequency.

On the other hand, FIG. 11 indicates that the ceramics of Comparative Example 5 not subjected to the mechanochemical treatment exhibit no relaxer ferroelectric behavior. In the other examples and comparative examples, the same tendency was observed. In this way, the mechanochemical treatment has the effect of decreasing changes in the dielectric constant with temperature and thus stabilizing the dielectric constant.

Further, although the magnesium hydroxide used in each of the examples has a as low purity as 95.4%, as shown in Table 1, the composite oxide ceramics as final products have good characteristics, as described above.

The production conditions and dielectric characteristics of composite oxide ceramics each having the stoichiometric composition of $0.9Pb(Mg_{1/3}Nb_{2/3})O_3$-$0.1PbTiO_3$, which were quoted from the references below, are summarized in Table 4 below. The composite oxide ceramics were produced on the basis of the columbite method and the molten salt method, both of which are representative of conventional production processes, as described above in "Description of the Related Art", and the production method of Example 5.

The production processes of the columbite method and the molten salt method were quoted from References 1 and 2 below, respectively.

Reference 1: S. L. Swartz et al., J. Am. Ceram. Soc., 67 [5], 311–315 (1984)

Reference 2: Katayama et al., J. European Ceramic Soc., 5 (1989), 183 [9]

TABLE 4

| Name of Production Process | Columbite Method (Swartz) | KCl Molten Salt Method (Katayama) | Method of This Invention (Example 5) |
| --- | --- | --- | --- |
| Calcination Conditions (Temperature-Time) | 800° C.-4 Hr | 900° C.-1 Hr | 850° C.-4 Hr |
| Sintering Conditions (Temperature-Time) | 1200° C.-1 Hr | 1200° C.-3 Hr | 1200° C.-2 Hr |
| Maximum Dielectric Constant Kmax | 21200 | 22000 | 23500 |
| Transformation Temperature Tc (°C.) | 40 | 30 | 41 |

The results shown in Table 4 reveal that, although the calcination conditions and the sintering conditions are substantially the same in all production processes, the maximum dielectric constant of the ceramic produced by the production method of Example 5 is increased by 10% or more, as compared with the ceramics produced in accordance with the columbite method. The production method of Example 5 can thus provide ceramics having excellent dielectric characteristics. Even if the calcination conditions and the sintering conditions are taken into consideration, the production method of this example is outstanding for its simple process, and is superior to the other two production methods.

As described above, when the raw material mixture powder is subjected to the mechanochemical treatment to obtain the precursor in the early stage, the activity of the raw material mixture powder is enhanced. In the step of heat treatment of the raw material mixture (precursor), reaction for synthesizing a perovskite solid solution is accelerated. As in the examples, the dielectric constants of the ceramics prepared by solid phase reaction including the mechanochemical treatment are significantly improved, as compared with the ceramics prepared by the other conventional production processes.

As described above, the method of producing composite oxide ceramics in accordance with the present invention comprises the mechanochemical treatment for grinding the raw material mixture powder used as a starting material with a degree of impact which provides a centrifugal effect of at least 15. The method can thus uniformly disperse the raw material mixture powder within a short time, and significantly enhance the reactivity. Since the raw material mixture powder is activated, the reaction rate is increased even by heat treatment at a low temperature, thereby speeding up the formation of single-phase ceramics. As a result, it is possible to efficiently produce composite oxide ceramics having a single perovskite structure containing a small amount of impurity phase.

Although a conventional simple mechanical process of grinding and mixing a raw material powder requires a mixing and grinding time of 10 hours for obtaining a uniformly-dispersed raw material mixture powder (precursor), the mechanochemical treatment for providing a centrifugal effect of at least 70 permits uniform dispersion and activation of the raw material mixture powder within a short time of 1 to 2 hours.

When at least one of a metallic hydroxide having an OH group and hydrous gel containing a hydrate was added to the raw material mixture powder, the reaction rate was increased due to the soft mechanochemical effect, and reaction could be effected at a low temperature.

Even in composite oxide ceramics containing at least three metallic elements, the stoichiometric composition can be maintained, and excess PbO need not be previously added to the raw material mixture powder in view of the volatile content. Therefore, composite oxide ceramics having less variation in the composition can be obtained.

In addition, the short processing time decreases the amount of the impurities to be mixed in the raw material mixture powder, and thus causes the formation of composite oxide ceramics of high purity. Since the composite oxide ceramics have a homogeneous fine structure having less pores, which comprises a high-purity single-phase perovskite phase, the electric characteristics such as the dielectric constant are significantly improved, and the stability of the characteristics to temperature changes is also improved.

Since the use of the activated precursor permits the sintering operation at a lower temperature than a conventional method, the crystal grain growth is effectively suppressed during sintering, and a fine structure comprising only fine crystal grains can be obtained. Therefore, the strength of a composite oxide ceramic material is increased, thereby obtaining a ceramic material having excellent durability and structural strength.

Since the calcination and sintering temperatures can be set to lower values, the heat resistant specifications of an apparatus such as the sintering furnace need not be made strict. It is thus possible to use the sintering or heating apparatus which can be constructed at low cost, and reduce the running cost of the apparatus and the production cost of composite oxide ceramics.

Further, since each of the steps of uniform dispersion, mechanochemical treatment, calcination and sintering is simplified, and the processing time is reduced, the production efficiency of composite oxide ceramics can significantly be improved.

What is claimed is:

1. A method of producing composite oxide ceramics comprising the steps of:

mixing a metallic hydroxide or metallic hydrous gel with a plurality of metallic oxide powders to prepare a raw material mixture powder;

activating the resulting raw material mixture powder by mechanochemical treatment by grinding the raw material mixture powder under conditions of repeatedly providing a mechanical impact force which provides a centrifugal acceleration of at least 15 times gravitational acceleration (g), to form a precursor; and synthesizing composite oxide ceramics by heat treatment of said precursor obtained by activation.

2. A method of producing composite oxide ceramics according to claim 1, wherein the step of synthesizing composite oxide ceramics comprises the steps of calcining the precursor obtained by activation at a temperature of 400° to 900° C. to form a calcined product, molding a ground powder of the calcined product to form a molded product, and sintering the molded product at a temperature of 1000° to 1250° C.

3. A method of producing composite oxide ceramics according to claim 1, wherein the mechanochemical treatment is performed under a condition of a centrifugal acceleration of 70 g or more.

4. A method of producing composite oxide ceramics according to claim 1, wherein the mechanochemical treatment time is 1 to 2 hours.

5. A method of producing composite oxide ceramics according to claim 1, wherein the metals which constitute the metallic oxides and the metallic hydroxide include at least one metallic element selected from the group consisting of tetravalent metallic elements including silicon, titanium and zirconium; and at least one metallic element selected from the group consisting of divalent metallic elements including magnesium, calcium, strontium and lead, trivalent metallic elements including aluminum, lanthanum and yttrium, and pentavalent metallic elements including niobium and vanadium.

6. A method of producing composite oxide ceramics according to claim 1, wherein the metals which constitute the metallic oxides and the metallic hydroxide include at least three metallic elements selected from the group consisting of tetravalent metallic elements including silicon, titanium and zirconium, divalent metallic elements including magnesium, calcium, strontium and lead, trivalent metallic elements including aluminum, lanthanum and yttrium, and pentavalent metallic elements including niobium and vanadium.

7. A method of producing composite oxide ceramics according to claim 1, wherein the particle size of the raw material mixture powder as a staring material is set within the range of 1 nm to 1000 µm.

* * * * *

UNITED STATES PATENT AND TRADEMARK OFFICE
CERTIFICATE OF CORRECTION

PATENT NO. : 5,795,537
DATED : August 18, 1998
INVENTOR(S) : Mamoru SENNA, et al.

It is certified that error appears in the above-identified patent and that said Letters Patent is hereby corrected as shown below:

On the title page, Item [75], the second inventors' residence is incorrect. It should be:

--Taegu, Korea--, change "all" to --both--.

Signed and Sealed this

Second Day of March, 1999

Attest:

Q. TODD DICKINSON

Attesting Officer     Acting Commissioner of Patents and Trademarks